Patented Oct. 27, 1953

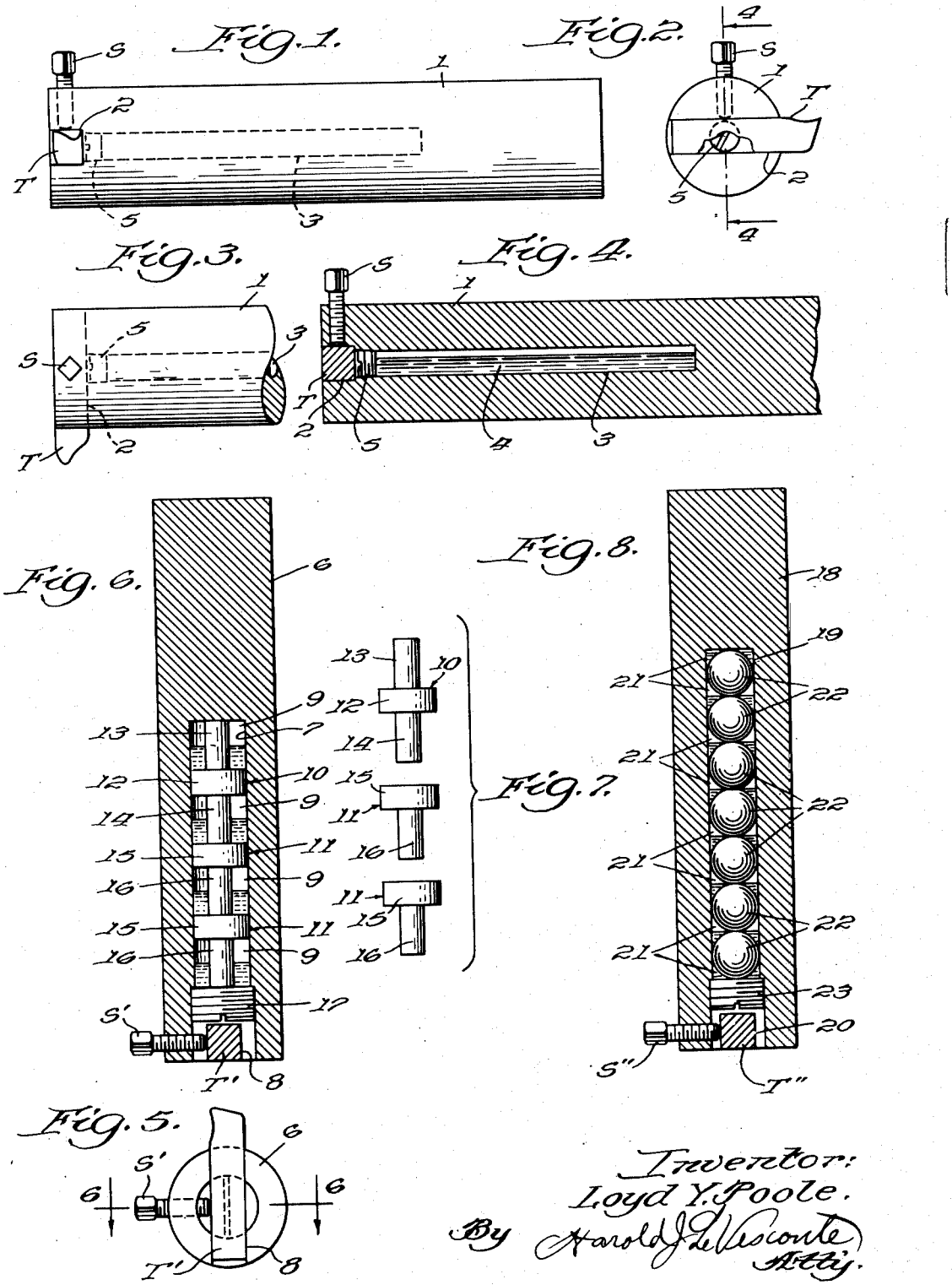

2,656,742

UNITED STATES PATENT OFFICE 2,656,742

BORING BAR

Loyd Y. Poole, Glendale, Calif.

Application December 19, 1950, Serial No. 201,609

3 Claims. (Cl. 77—58)

This invention relates to boring bars and particularly to a form thereof so designed as to eliminate chattering at cutting loads at which such chattering would ordinarily occur.

In machine tools employing boring bars for forming accurately machined bores and especially in the case of long or deep bores, the tool bit is clamped to the distal end of a bar mounted on the tool slide of the machine and the bar is generally somewhat longer than the length or depth of the bore. In making a cut with a boring bar the cutting speed, the depth of cut and the rate of feed must be so interrelated as to effect the most efficient operation consistent with the load capacity of the boring bar and especially in operations in which the distal end of the bar is unsupported. When overloaded, the bar will spring away from the work surface and chatter with the resultant production of a rough surface and possible damage to or scrapping of the work. In effect, the prior art boring bars may be compared to immense tuning forks having natural periods of vibration. The destruction of such periods of vibration would make possible the taking of faster or heavier cuts with the resultant increase in production and decrease of liability of damaged or scrapped work.

With these considerations in mind, it is an object of the present invention to provide a boring bar for use with lathes or other machine tools employed for finishing internal circular surfaces which is so constructed as to eliminate chattering which would otherwise occur in a conventional boring bar of the same size and length under a given tool point load.

Another object of the invention is to provide a boring bar containing a quantity of mercury or other heavy fluid enclosed within the distal or tool carrying end thereof and effective to dampen vibrations incident to cutting operations.

Still another object of the invention is to provide a vibration dampening boring bar for finishing internal circular surfaces rotating about a horizontal axis.

A further object of the invention is to provide a vibration dampening boring bar for finishing internal circular surfaces rotating about a vertical axis.

A still further object of the invention is to provide a vibration dampening boring bar for use in vertical lathes, boring mills and similar machine tools in which separate quantities of mercury or other heavy fluid are enclosed within the distal end of the boring bar.

Still another object of the invention is to provide a vibration dampening boring bar which is simple in construction, economical to manufacture, and reliable in use.

With the foregoing objects in view, together with such other objects and advantages as may subsequently appear, the invention resides in the parts, and in the construction, combination, and arrangement of parts, disclosed by way of example, in the following specification of certain modes of execution of the invention: reference being had to the accompanying drawings which form a part of said specification and in which drawings:

Fig. 1 is a side elevation of a boring bar embodying the invention: the boring bar being adapted for use in horizontal boring operations, Fig. 2 is an elevation of the tool carrying end of the boring bar shown in Fig. 1, a portion of the tool bit being broken away to disclose internal construction, Fig. 3 is a top plan view of the tool carrying end of the boring bar shown in Fig. 1, Fig. 4 is a sectional view of the tool carrying end of the boring bar; the view being taken on the line 4—4 of Fig. 3, Fig. 5 is an end elevation of the tool carrying end of a boring bar embodying the invention and adapted for vertical boring operations, Fig. 6 is a sectional view taken on the line 6—6 of Fig. 5, Fig. 7 is a side elevation of the compartment forming elements employed in the form of bar shown in Figs. 5 and 6, and Fig. 8 is a sectional view, similar to Fig. 6, but showing a second form of boring bar adapted for vertical boring operations.

Referring first to Figs. 1 to 4, inclusive, there is shown a boring bar 1 having a diametrical slot 2 in one end thereof in which a tool bit T is clamped by a set screw S. The illustrated tool bit is provided with a single cutting point, but a double ended tool bit may be equally well employed and the mode of mounting the tool bit may be as shown or any of the other conventional and well known modes of securing a tool bit to a boring bar may be employed.

The boring bar 1 is provided with an axially disposed bore 3 extending from the rear face of the tool bit slot 2 for a portion of the length of the bar and this bore is partially filled with a quantity of mercury or other heavy fluid 4 and closed by a taper threaded screw 5 which engages threads at the outer end of the bore 3.

It has been found that the presence of the mercury in the distal end of the bar dampens the tendency of the bar to vibrate and chatter under cutting load conditions which would otherwise produce those undesirable effects and consequently, the depth of cut or rate of feed or the cutting speed or a combination of those factors may be materially increased before vibration and chattering effects will occur.

Referring next to Figs. 5, 6 and 7, there is shown an adaptation of the principles of the invention to a boring bar for finishing vertically disposed bores. While the first described form of the invention may also be employed for forming vertical bores, the fluid will be contained in a single body at the lower end of the bar and will not be as effective to dampen the tendency of the bar to vibrate as can be achieved if the fluid is extended along a portion of the length of the bar. The efficiency of the bar will be increased, but a greater increase in capacity and efficiency can be achieved by the forms of the invention now to be described.

To provide a convenient construction in which the fluid is extended along a portion of the length of a vertically disposed boring bar, the bar 6 is provided with an axially disposed bore 7 extending from the tool bit end, which bore is somewhat larger in diameter than the slot 8 in which a tool bit T' is secured by a set screw S'. The interior of the bore 7 is divided into a series of spaced annular chambers 9 by a series of partition forming elements comprising a primary element 10 and one or more secondary elements 11. The primary element includes a disc-like center portion 12 adapted to make a tight press fit with the bore 7 and a pair of coaxially disposed shank elements 13 and 14 projecting from the opposite sides of the disc, while each secondary partition forming element comprises a partition forming disc-like head portion 15 with a coaxially disposed shank 16 projecting from one side only.

In assembly, the boring bar is placed with the bore end uppermost and a quantity of mercury or other heavy fluid sufficient to partially fill the innermost cavity or chamber 9 is poured into the bore. The primary partition forming element 10 is then pressed into place with the shank portion 13 positioned against the bottom of the bore. Next another quantity of fluid is poured into the bore sufficient to fill the next chamber to the desired extent and a secondary element 11 is pressed into the bore with the head portion 15 thereof engaging the end of the shank 14 of the primary element and thus forming the next chamber. This is repeated until the bore is thus filled after which the end of the bore 7 is closed by a screw plug 17 which also bears against the end of the shank 16 of the last inserted element 10 and forms an end wall of the last chamber 9. Thus, the bore is converted into a series of chambers each containing a quantity of fluid which act to dampen the tendency of the bar and tool to vibrate and thereby to increase the cutting capacity thereof in the same manner as in the first described form of the invention. The size and length of the bore and the number of compartments into which it is divided are matters of choice, but the approximate proportions shown in the drawings are satisfactory for general application.

Fig. 7 shows a modification of the form of bar shown in Figs. 5 and 6. In this form of the invention, the boring bar 18 is provided with an axial bore 19 extending from the tool holding slot 20 which is adapted to hold a tool bit T'' clamped therein by a set screw S''. The annular, fluid holding chambers 21 are formed by a series of balls 22 pressed into the bore one at a time with alternate quantities of mercury each of which is sufficient to partially fill the compartment formed between adjacent balls or between the ball at either end and the bottom of the bore or the screw plug 23 which both closes the end of the bore and bears against the row of balls inserted in the bore.

The action of the boring bar thus dampened is the same as previously described but to a slightly lesser extent. It has the advantage of being easier to manufacture since the compartment forming balls are ordinary bearing balls and may be purchased for that purpose and the separate manufacture of separate partition forming means thus dispensed with.

As in the first described form of the invention, other conventional modes of mounting the tool bits may be employed in the vertical type of bars instead of the specific form shown and the tool bits may be either single or double ended, as desired. Further, it will be apparent that the bars adapted for vertical boring may be equally well employed for horizontal boring operations although more expensive to make for this purpose alone. Thus, each illustrated form of the invention has its own special advantages but all forms are useful for either horizontal or vertical boring.

While the foregoing specification discloses certain forms of the invention, it is not intended that the invention shall be limited to the exact forms so disclosed and it will be understood that the invention embraces all such modifications in the parts and in the construction, combination and arrangement of parts as shall come within the purview of the appended claims.

I claim:

1. A boring bar for use with boring mills, vertical lathes and similar machine tools; one end of said bar having a tool shank receiving slot and means for detachably clamping a tool bit in said slot, an axially disposed bore extending from said slot toward the opposite end of said bar, a plurality of inter-engaging partition forming devices disposed in said bore dividing the interior thereof into a plurality of axially aligned annular cavities; each of said cavities being partially filled with mercury, and a screw plug disposed wholly inwardly of said slot closing the open end of said bore and simultaneously pressing said partition forming devices against each other and against the bottom of said bore.

2. A boring bar for use with boring mills, vertical lathes and similar machine tools; said bar having means for detachably clamping a tool bit at one end thereof, an axially disposed bore extending from the tool bit carrying end thereof, a plug closing the open end of said bore, means in said bore dividing the interior thereof into a plurality of axially aligned annular cavities; each of said cavities being partially filled with mercury; said dividing means comprising a primary element including a central disc engaging the walls of said bore with a press fit, a first shank member projecting from one side thereof and engaging the end of said bore and a second shank member projecting from the opposite side of said disc, and a plurality of secondary members each having a disc engaging the walls of said bore with a press fit and a shank portion extending toward the open end of said bore; each of said secondary elements being spaced from the next preceding element by engagement of the disc portion thereof with the end of the shank of the preceding element, and said plug serving both to close said bore and to engage the end of the shank of the outermost of said secondary elements with resultant formation of one of said cavities.

3. A vibration dampening boring bar for use with machine tools; said bar having a transverse tool bit holding slot at one end thereof and means for clamping a tool bit in said slot, an axially disposed bore extending from the inner face of said slot toward the opposite end of said bar, a screw threaded plug closing the end of said bore, means in said bore dividing the interior thereof into a plurality of axially aligned annular cavities; each of said cavities being partially filled with mercury; said dividing means comprising a primary element including a central disc engaging the walls of said bore with a press fit, a first shank member projecting from one side thereof and engaging the end of said bore and a second shank member projecting from the opposite side of said disc, and a plurality of secondary members each having a disc engaging the walls of said bore with a press fit and a shank portion extending toward the open end of said bore; each of said secondary elements being spaced from the next preceding element by engagement of the disc portion thereof with the end of the shank of the preceding element, and said plug serving both to close said bore and to engage the end of the shank of the outermost of said secondary elements with resultant formation of one of said cavities.

LOYD Y. POOLE.

References Cited in the file of this patent

UNITED STATES PATENTS

| Number | Name | Date |
| --- | --- | --- |
| 1,700,477 | Goode | Jan. 29, 1929 |
| 2,051,954 | Leland | Aug. 25, 1936 |
| 2,302,670 | Buchanan | Nov. 24, 1942 |